United States Patent
Ailton Rodrigues et al.

(10) Patent No.: US 8,435,322 B2
(45) Date of Patent: May 7, 2013

(54) ENHANCED PROCESS TO PRODUCE A THERMOFERTILISER FROM POTASSIUM-BEARING MINERALS

(75) Inventors: Sebastião Ailton Rodrigues, Minas Gerais (BR); Ruberlan Gomes Da Silva, Minas Gerais (BR)

(73) Assignee: Vale S.A., Rio de Janeiro (BR)

( * ) Notice: Subject to any disclaimer, the term of this patent is extended or adjusted under 35 U.S.C. 154(b) by 140 days.

(21) Appl. No.: 12/916,132

(22) Filed: Oct. 29, 2010

(65) Prior Publication Data

US 2011/0232347 A1  Sep. 29, 2011

Related U.S. Application Data

(60) Provisional application No. 61/256,621, filed on Oct. 30, 2009.

(51) Int. Cl.
  *C05D 1/04*  (2006.01)
(52) U.S. Cl.
  USPC .................................................. 71/61

(58) Field of Classification Search ............... 71/61–63
  See application file for complete search history.

(56) References Cited

U.S. PATENT DOCUMENTS

| | | | | |
|---|---|---|---|---|
| 3,143,410 | A * | 8/1964 | Smith | 71/64.07 |
| 3,266,886 | A * | 8/1966 | Middleton | 71/64.05 |
| 3,501,282 | A * | 3/1970 | Titus | 71/28 |
| 4,313,753 | A * | 2/1982 | Segawa et al. | 71/61 |
| 4,334,908 | A * | 6/1982 | Duchateau et al. | 71/52 |
| 5,431,708 | A * | 7/1995 | Lehmann et al. | 71/28 |

\* cited by examiner

*Primary Examiner* — Wayne Langel
(74) *Attorney, Agent, or Firm* — Arent Fox LLP

(57) ABSTRACT

A simplified and enhanced process to produce thermofertiliser obtained from potassium and phosphorous-bearing minerals is provided, where these elements may or may not be in citric acid or insoluble in water. The process also includes the use of specific additives, at the beginning of the process or immediately before the beginning of the thermal treatment step, in order to increase the potassium and phosphorous contents in the product and the overall efficiency of the process and also to promote the production of a high quality thermofertiliser.

19 Claims, 2 Drawing Sheets

Figure 2:
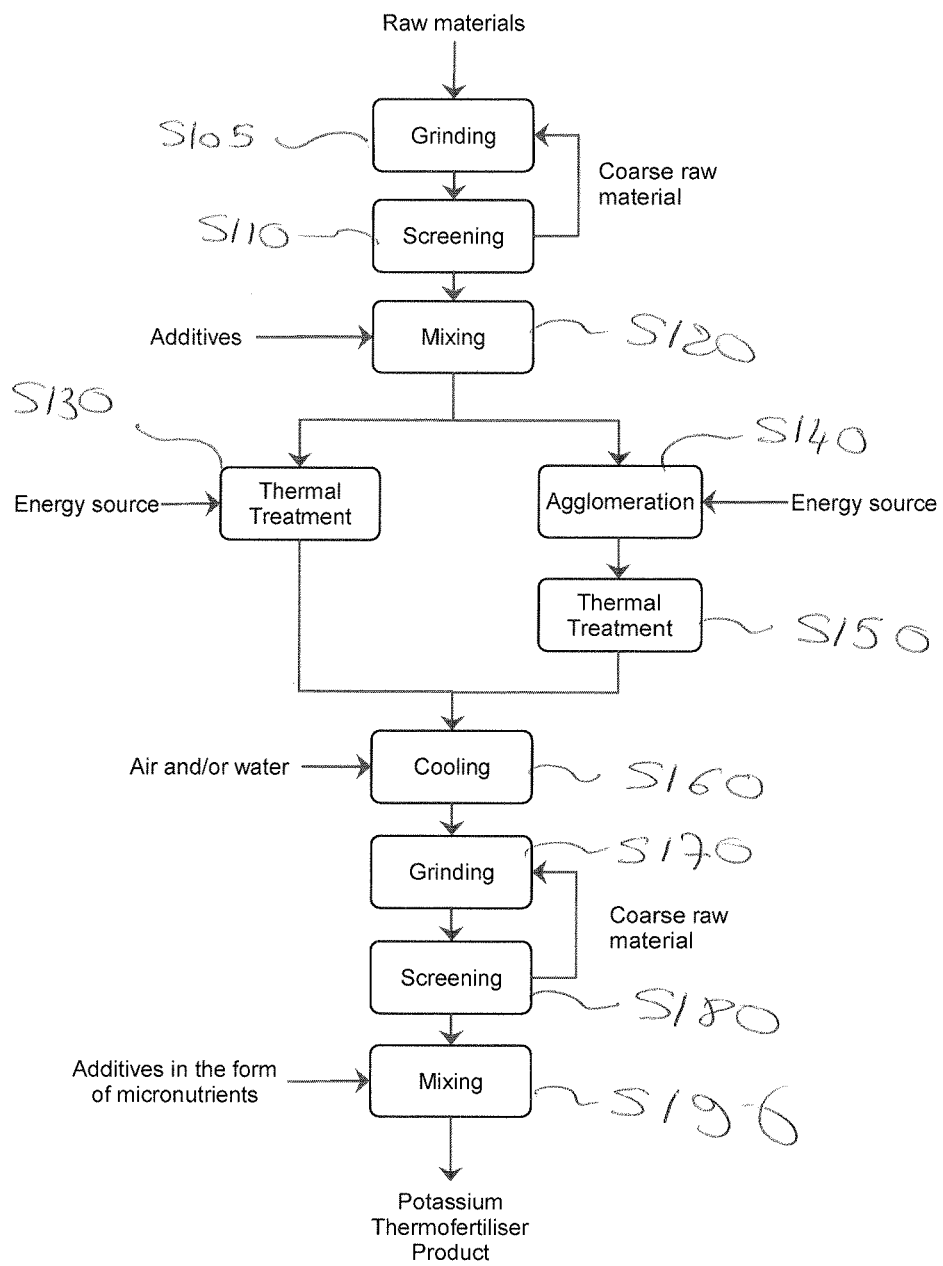

Table 1 – Mineralogical distribution in each fraction

|  | Size distribution (µm) | | | | | |
|---|---|---|---|---|---|---|
| Mineral | -500/+300 | -300/+212 | -212/+150 | -150/+106 | -106/+74 | -74/+38 |
| Biotite | 5.89 | 5.80 | 5.51 | 5.66 | 5.73 | 5.64 |
| Muscovite | 75.13 | 73.51 | 75.64 | 74.23 | 70.30 | 64.63 |
| Feldspars | 18.98 | 20.69 | 18.85 | 20.11 | 23.97 | 29.73 |
| Total | 100.00 | 100.00 | 100.00 | 100.00 | 100.00 | 100.00 |

FIGURE 1

ENHANCED PROCESS TO PRODUCE A THERMOFERTILISER FROM POTASSIUM-BEARING MINERALS

RELATED APPLICATION

This application claims priority from U.S. provisional application No. 61/256,621, filed Oct. 30, 2009, titled "Enhanced Process to Produce Thermofertiliser from Potassium-Bearing Minerals," and is hereby incorporated by reference in its entirety.

BACKGROUND OF THE INVENTION

Aspects of the present invention relate to an enhanced process to produce a thermofertiliser from potassium-bearing minerals, more specifically silicate minerals and phosphate mineral using a thermal treatment process.

It is generally known in the art that potassium can be extracted from potassium-bearing minerals, like slate ores, using either thermal or hydrometallurgical methods, or combinations of both. There are studies about the dissolution of potassium from potassium minerals (feldspar, mica) and from glauconite in inorganic acids. Fogler and Lung (1975), among other researchers, have studied the dissolution of potassium feldspar in HF and HCl acid mixtures.

Preliminary studies have been conducted by Eichler (1983), from Universidade Federal de Lavras, in the state of Minas Gerais, Brazil, on assayed mixtures with 50% of potash-bearing ore and 50% limestone. The researchers concluded that for use as a potash source, the minerals have to be calcinated together with a source of limestone. Accordingly, these mixtures were calcined at about 1,100° C. during lab tests, and assayed for agronomic use. The results conducted in corn culture show that the efficiency of potassium absorption was equivalent to traditional potash fertilizer (KCl). The main focus of the above study was to test the feasibility of the use of a specific silicate mineral, called Verdete, as a potash source for the production of fertilizers, and the feasibility of this technique was confirmed.

The above results from Eichler (1983), related to the agronomic assay indicate that, even when the final product is a compound that has low solubility in water and a relatively high solubility in citric acid, the agronomic efficiency of the mineral is satisfactory, particularly when compared to a mineral coming from a conventional potash source such as KCl, which is completely soluble in water.

U.S. Pat. No. 4,334,908 describes the production of a vitreous fertilizer that was obtained from raw materials having high water solubility ($NH_4H_2PO_4$, $KH_2PO_4$ and $CaHPO_4$), where these raw materials were mixed with feldspar or granite, the feldspar and granite being added in order to produce potassium (K) and phosphorous (P), which are insoluble in water. This patent uses raw materials that are expensive and that must be processed to decrease their water solubility. This patent has an objective to reduce the water solubility of compounds which raw materials have high water solubility. Reducing the water solubility is generally very expensive. The process described in this patent starts with the use of pure raw materials that already have high solubility in water, and aims to render these materials insoluble in water and to promote a slow release of their nutrients from the fertilizer produced from the materials. In contrast to the above patent, various aspects of the process described in the present invention propose a different product and starts with materials that are insoluble in water to later become soluble in citric acid in order to avoid nutrient losses in the final thermofertiliser produced.

U.S. Pat. No. 4,313,753 describes a process where a mixture of a potassium source, such as caustic potash or potassium carbonate, and a silicon source, such as fly ash, is dried and calcined at a temperature of about 600° C. to about 1,000° C. According to this process, the silicon content in the fly ash reacts with the potassium resulting in the potassium product having high solubility in citric acid. As in the previously discussed patent, this patent has for objective to reduce the water solubility of raw materials that originally have high water solubility. The complexity of equipment and process to be used in the above patent can result in a very costly process.

The roast-leach method for extraction of potassium has also been extensively studied over the years. Mazumber, Sharma and Rao (1993) disclosed a process for the extraction of potassium from glauconite sandstone. Mazumber, Sharma and Rao described the roast kinetics with calcium chloride, where after a roasting step, potassium is recovered from potassium chloride by leaching using distilled water. Further developments in this process were made, but industrial applications using the process and concept of Mazumber, Sharma and Rao is very costly and has a low efficiency. Direct acid leaching is also known as an alternative process for the roast and leaching treatment for obtaining products containing high grade of a mineral such as potash.

It is also known in the art that the use of a sintering process for iron ore and also for a mixture of phosphate concentrate and slag, the latter one to produce a phosphate fertilizer. Such arrangement is describe in the patent document BRPI 9501458-6, filed by Usiminas in Brazil. This application uses aciaria slag in sintering processes for production of agricultural thermo-phosphate fertilizers by mixing the slag with phosphates, lime and/or dolomite, sodium salts, solid carbonaceous fuel and water in a mixer. The focus of this process is to overcome the economic and environmental problems of storage of slag.

Although being largely known, fusion processes or independent potassium extraction techniques such as calcination followed by leaching are generally considered to result in high costs and to have a low efficiency in many cases.

SUMMARY

In light of the above described problems and unmet needs, the described aspects of the present invention provide a thermal treatment process that includes, in addition to a calcination treatment, additional steps, for example, a sintering step that promotes and applies specific conditions to promote the occurrence of micro-fusion in the particles of a mixture of raw materials and additives.

Aspects described herein also propose the use of silicate minerals, such as Verdete, as one source of potash, associated with phosphate minerals and other additives, with the purpose of increasing the grade of nutrients in potash and phosphorous and also to allow the solubilization of these nutrients in citric acid. In addition, various aspects described herein include the use of a silicate mineral, such as Verdete ore, which also supplies potash to the final product, as the main source of silica. Aspects described herein allow the use of silicate minerals similar to the Verdete ore, which is a potash source not widely used in the industry for producing thermofertilisers. This type of ore brings benefits to the overall process and to the final product, as it has a lower energetic costs, a low correlation between the amount of gangue and minerals, and a high potash content (about 10% $K_2O$).

Aspects described herein aim to overcome the technical and economic hurdles suffered by others technologies and processes by proposing a simplified thermal treatment process to obtain a thermofertiliser. Accordingly, aspects described herein include the use of additives at the beginning of the process or, alternatively, immediately before the thermal treatment step, depending upon the size distribution of the additive. Further, a variety of sources of raw materials can be used in order to increase the potassium and phosphorous contents in the product, increase the overall efficiency of the process, and increase the quality of the thermofertiliser produced.

An exemplary difference between the prior art processes described above and an aspect of a process disclosed herein is the use of raw materials that already have the potash in a water soluble form that is transformed to a form that is soluble in citric acid. Another difference is in the thermal treatment stage that promotes calcination and sintering stages in a joint operation.

Additional advantages and novel features of the present aspects will be set forth in part in the description that follows, and in part will become more apparent to those skilled in the art upon examination of the following or upon learning by practice of the aspects. The use of the raw material according to exemplary aspects facilitates the overall chemical process applied, and promotes the use of ores that already include potash having the water-insoluble characteristic desired in the final product. Due to this characteristic, the raw materials do not need to be processed in order to change their solubility in water.

BRIEF DESCRIPTION OF THE INVENTION

Various exemplary aspects of the systems and methods will be described in detail, with reference to the following figures, wherein:

FIG. 1 is a table illustrating the composition of a typical Verdete ore with respect to size distribution; and FIG. 2 is a flowchart illustrating an exemplary aspect of a process of the present invention.

DESCRIPTION OF PREFERRED EMBODIMENTS

The above noted and other features and advantages of the present aspects are described in, or are apparent from, the following detailed description of various exemplary aspects.

FIG. 1 is a table illustrating the composition of a typical Verdete ore with respect to size distribution. Verdete ore, a kind of slate that occurs in Cedro de Abaeté, in the State of Minas Gerais in Brazil, is a source of potassium, which includes minerals such as biotite, muscovite and feldspars as potassium sources, as illustrated in Table 1. The potash ($K_2O$) content in the Verdete ore is about 10%, generally in the range of 9-12%. The Verdete ore may be one of the silicate minerals used as a raw material in the process described herein.

FIG. 2 is a flowchart of an aspect of a process producing a thermofertiliser from potassium-bearing minerals. An exemplary aspect of a thermal treatment process is described as a method to produce a thermofertiliser based on sintering of mixtures containing phosphate mineral, potassium-bearing minerals such as, for example, Verdete ore, limestone, and other water soluble potassium sources such as sylvinite and muriate of potash (potassium chloride) used in order to increase the potassium content in the resulting thermofertiliser. Aspects of the described method increase overall nutrients extraction and improve process cost effectiveness.

One of the advantages of the described aspects and the thermal treatment process proposed is the occurrence of micro fusions on the surface of particles created via a sintering step during thermal treatment, where chemical reactions take place. Sodium carbonate, calcium-sodium borate, magnesium chloride or sulphate salts (as calcium and magnesium sulphates) can also be used to increase the potassium and phosphorous extraction from the ores and to reduce the temperature in the thermal treatment step.

Due to this and other advantages, the exemplary process described herein does not generate a fusion reaction, which represents an advantage compared to conventional fusion processes in terms of energy consumption, achieving about 40% energy saving. Also, the fusion step in conventional processes can generate unwanted by-products (slags), the generation of which is thereby prevented according to the described aspects. In addition, the mass recovery of the process according to the described aspects is generally higher than in conventional processes, and little or no solid residue is generated.

According to various aspects, the method begins at S105, where the raw materials are ground down to a size that falls within a desired range. According to various aspects, the desired range may be between 0.037 mm and 2 mm. Once the raw materials are ground down during S105, the raw materials are screened at S110 to determine the size of the resulting materials. If the size of the resulting materials, determined at S110, is within a desired range, then the method continues to S120. If, on the other hand, the size of the raw materials determined at S110 does not fall within the desired range, then the method returns to S105, where the raw materials are again subject to the step of grinding. Once it has been established at S110 that the size of the ground materials is within the desired range, then the method continues to S120, where the raw materials are mixed with additives and are optionally subjected to an agglomeration process, depending on the choice of the equipment used to sinter the materials during the heating step S130 or S150. According to various aspects, the additives may be, for example, limestone, sylvinite and muriate of potash. According to various aspects, when the heating step S130 is to be performed in a rotary kiln, then no previous agglomeration of the mixture of raw materials and additives may be necessary. On the other hand, when a sintering roaster is to be used during S150, then the raw materials and the additives may be subjected to an agglomeration step S140 prior to the heating step S150, due to the use of the sintering roaster.

According to various aspects, once the raw materials have been mixed at S120, or have been agglomerated at S140, the raw materials are submitted to a thermal treatment at S130 or S150. According to various aspects, during the thermal treatment steps S130 or S150, the heating may be performed at a temperature between about 300° C. and 1,600° C. Alternatively, the heating may be performed at a temperature between about 850° C. and 1,300° C. According to various aspects, the residence time, or time of heating of the raw materials mixed with the additives at the above temperatures may be in the range of about 1 to 10 hours. According to various aspects, the time of heating of the raw materials mixed with the additives at the above temperatures may also be in the range of about 1 to 4.5 hours. According to various aspects, coal, oil, gas, biomass or any other energy source can be used to provide energy to the above-described heating step S130 or S150.

According to various aspects, when the thermal treatment at S130 or S150 has been completed, the method continues to S160, where the heated mixture of raw materials and additives may be cooled down to a lower temperature such as, for example, room temperature, or any other temperature. This cooling at S160 may be performed using air, water or any other known cooling technique. According to various aspects, after cooling at S160, the process may optionally include further grinding the mixture of raw materials and additives in order to adjust the particle size of the mixture to a desired size range and/or to achieve commercial product specifications.

According to various aspects, after cooling at S160 or after grinding at S170, the resulting material may be screened at S180 in order to determine whether the particle size of the treated mixture is within the desired size range. If the particle size of the treated mixture is not within the desired size range, then the method continues to S170 for further grinding of the treated mixture until the particle size of the mixture falls within the desired size range. On the other hand, if the particle size of the treated mixture screened at S180 is within the desired size range, then the method continues to S190, where the treated mixture is further mixed to include additives, for example but not limited to, micronutrients. According to various aspects, the micronutrients added to the treated mixture may include boron, manganese, copper, cobalt and molybdenum, depending upon the marketing and/or commercial or other requirements of the final product.

According to various aspects, the product obtained as a result of the above-described steps may include two main nutrients: phosphorus and potassium. The resulting product may also have a better efficiency when used in acid soils because the high calcium and magnesium oxide contents, which are considered a base (having a pH higher than 7.0), can adjust the soil acidity by decreasing or eliminating the need for using neutralizing agents. The resulting product of the above-described steps may also contain silicon, calcium and magnesium as nutrients playing an important role in obtaining and maintaining a good crop quality.

According to various aspects, in order to evaluate the quality of the resulting product, the potassium and phosphorous contents in the thermofertiliser can be extracted using a citric acid solution, achieving up to about 85-95% extraction. This high extraction content shows that the nutrients potassium and phosphorous have a low water solubility, which is one of the benefits of the described aspects. This characteristic promotes smaller amounts of losses via natural leaching in the ground when the product is used as, for example, a fertilizer.

During the overall process of the described aspects, about 60 to 90% of the raw material is insoluble in both water and citric acid. The insoluble materials include insoluble potassium in the form of $K_2O$, for example, of Verdete ore, or insoluble phosphorous in the form of $P_2O_5$ from a phosphate mineral. According to various aspects, these insoluble raw materials are rendered soluble in citric acid. In addition, the raw materials that are already soluble in water have their solubility in citric acid increased and their solubility in water decreased by about 15 to 50%. This aspect results in a final product that has a low solubility in water and a high solubility in citric acid. These qualities are generally desired in the composition of a thermofertiliser because it avoids losses of nutrients when used for agronomic purposes.

According to various aspects, initial laboratory tests indicate that a composition of raw materials and additives for starting a process that can improve the solubilization of potassium may be as follows: 15 to 48% by weight of ore such as, for example, Verdete ore or any another potassium-bearing minerals, 25 to 46% phosphate mineral, 4 to 12% by weight potassium chloride, 10 to 22% by weight dolomite and 4 to 15% by weight sodium carbonate. According to various aspects, various features and advantages of the above composition include: i) increased extraction of valuable nutrients such as potassium and phosphorous from potassium-bearing minerals, such as the Verdete ore and phosphates minerals; ii) better deposit exploitation in the case of Verdete ores deposits; iii) final products having high quality when used for agronomic purposes due to the low solubility in water and high solubility in citric acid; iv) reduced energy consumption; v) recovering two or more nutrients provided by the same product; vi) high mass recovery without generation of solid residues; and vii) nutrients with low water solubility but high solubility in citric acid solution having a high value to crops. The following illustrates examples of mineral compositions.

EXAMPLE 1

A mixture containing 30.3% of Verdete ore (12.5% $K_2O$), 37.9% by weight of phosphate mineral (30.0% total $P_2O_5$ and 9.0% $P_2O_5$ soluble in 2% aqueous citric acid solution), 7.6% by weight of muriate of potash (KCl-60.0% $K_2O$), 15.1% by weight of dolomite and 9.1% by weight of soda ash ($Na_2CO_3$) heated in an oven for one hour at a constant temperature of about 1,100° C. The size distribution of all raw materials used to prepare the mixture is about 44 μm (0.044 mm) for about 90% of the raw materials. After the above-described heating step is performed, the mixture is cooled, weighed and analyzed for potassium and phosphorous content that is soluble in an aqueous 2% citric acid solution. The resulting mass loss is about 17.7%, and the percentages of $K_2O$ and $P_2O_5$ soluble in the aqueous 2% citric acid solution are about 8.4% and 0.0%, respectively. Excluding the $K_2O$ and $P_2O_5$ soluble in the aqueous 2% citric acid solution in the raw materials, muriate of potash and phosphate mineral, the potassium and phosphorous extraction yields were about 59% and 0% respectively. $K_2O$, soluble in water and which comes from the muriate of potash, has its solubility in water reduced to about 36%, and becomes soluble only in citric acid. The phosphorous and potassium contents soluble in an aqueous solution of 2% citric acid in the thermofertiliser are about 4% and 8%, respectively, or 00-04-08 (N, $P_2O_5$ and $K_2O$ contents).

EXAMPLE 2

A mixture containing 48.0% of Verdete ore (12.5% $K_2O$), 40.0% by weight of phosphate mineral (30.0% total $P_2O_5$ and 9.0% $P_2O_5$ soluble in aqueous 2% citric acid solution) and 12.0% by weight of muriate of potash (KCl with 60.0% $K_2O$) is heated in an oven for one hour at a constant temperature of about 1,200° C. The size distribution of all raw materials used to prepare the mixture is about 44 μm (0.044 mm) for about 90% of the raw materials. After the heating process, the mixture is cooled, weighed and analyzed for potassium and phosphorous content that is soluble in an aqueous 2% citric acid solution. The resulting mass loss is about 13.4%, and the percentages of $K_2O$ and $P_2O_5$ soluble in the aqueous 2% citric acid solution are about 8.3% and 10.8%, respectively. Excluding the $K_2O$ and $P_2O_5$ soluble in the aqueous 2% citric acid solution in the raw materials, muriate of potash and phosphate mineral, the potassium and phosphorous extraction yields are about 0% and 68%, respectively. $K_2O$, soluble in water and which comes from the muriate of potash, has its solubility in water reduced to about 43%, and becomes soluble only in citric acid. The phosphorous and potassium contents soluble in an aqueous solution of 2% citric acid in the thermofertiliser are about 11% and 8% respectively, or 00-11-08 (N, $P_2O_5$ and $K_2O$ contents).

EXAMPLE 3

A mixture containing 32.1% by weight of Verdete ore (12.5% $K_2O$), 40.1% by weight of phosphate mineral (30.0% total $P_2O_5$ and 9.0% $P_2O_5$ soluble in aqueous 2% citric acid solution), 8.0% by weight of muriate of potash (KCl with 60.0% $K_2O$), 16.0% by weight of dolomite and 3.8% by weight of ulexite is heated in an oven for one hour at a constant temperature of about 900° C. The size distribution of all raw materials used to prepare the mixture is about 44 μm (0.044 mm) for about 90% of the raw materials. After the heating process, the mixture is cooled, weighed and analyzed for potassium and phosphorous content that is soluble in an aqueous 2% citric acid solution. The resulting mass loss is about 14.5% and the percentages of $K_2O$ and $P_2O_5$ soluble in an aqueous 2% citric acid solution are about 6.1% and 4.2%, respectively. Excluding $K_2O$ and $P_2O_5$ soluble in the aqueous 2% citric acid solution in the raw materials, muriate of potash and phosphate mineral, the potassium and phosphorous extraction yields are about 9% and 0% respectively. $K_2O$, soluble in water and which comes from the muriate of potash, has its solubility in water reduced to 13%, and became soluble only in citric acid. The phosphorous and potassium contents soluble in an aqueous solution of 2% citric acid in the thermofertiliser are about 4% and 6% respectively, or 00-04-06 (N, $P_2O_5$ and $K_2O$ contents).

While this process has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method of producing a thermofertiliser from potassium-bearing minerals comprising:
    grinding the potassium-bearing minerals;
    screening a size of the potassium-bearing minerals to determine whether the size of the potassium-bearing minerals is within a first size range;
    when the size of the potassium-bearing minerals is within the first size range, mixing the potassium-bearing minerals with a first set of additives;
    heating the mixed potassium-bearing minerals to a first temperature for a period of time;
    cooling the mixed potassium-bearing minerals down to a second temperature after the period of time;
    grinding the mixed potassium-bearing minerals;
    screening the size of the mixed potassium-bearing minerals to determine whether the size of the mixed potassium-bearing minerals is within a second size range; and
    when the size of the potassium-bearing minerals is within the second size range, mixing the potassium-bearing minerals with a second set of additives so as to form said thermofertiliser.

2. The method of claim 1, wherein the first set of additives comprises at least one of limestone, sylvinite or muriate of potash.

3. The method of claim 1, wherein the second set of additives comprises at least one of boron, manganese, copper, cobalt or molybdenum.

4. The method of claim 1, wherein the first size range of the potassium-bearing minerals is between about 0.037 mm and about 2 mm.

5. The method of claim 1, further comprising agglomerating the potassium-bearing minerals after the mixing with the first set of additives and before the heating.

6. The method of claim 1, wherein heating the mixed potassium-bearing minerals comprises calcinating and sintering the mixed potassium-bearing minerals.

7. The method of claim 1, wherein the heating results in the mixed potassium-bearing minerals undergoing micro-fusions following the heating.

8. The method of claim 1, wherein the heating is performed in a rotary kiln.

9. The method of claim 4, wherein the heating is performed in a rotary kiln.

10. The method of claim 6, wherein the heating is performed in a rotary kiln.

11. The method of claim 7, wherein the heating is performed in a rotary kiln.

12. The method of claim 5, wherein the heating is performed in a sintering roaster.

13. The method of claim 1, wherein the first temperature is in a range of about 300° C. to about 1,600° C.

14. The method of claim 1, wherein the first temperature is in a range of about 850° C. to about 1,300° C.

15. The method of claim 1, wherein the period of time is in a range of about 1 hour to about 10 hours.

16. The method of claim 1, wherein the period of time is in a range of about 1 hour to about 4.5 hours.

17. The method of claim 1, wherein the heating comprises using an energy source comprising one of coal, biomass, oil or gas.

18. The method of claim 1, wherein the cooling is performed using one of air or water.

19. The method of claim 13, wherein the period of time is in a range of about 1 hour to about 10 hours.

* * * * *